(12) United States Patent
Raskar

(10) Patent No.: US 11,691,908 B2
(45) Date of Patent: Jul. 4, 2023

(54) INSULATION MATERIALS FOR A VACUUM INSULATED STRUCTURE AND METHODS OF FORMING

(71) Applicant: WHIRLPOOL CORPORATION, Benton Harbor, MI (US)

(72) Inventor: Devidas B. Raskar, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/486,331

(22) Filed: Sep. 27, 2021

(65) Prior Publication Data

US 2022/0119304 A1 Apr. 21, 2022

Related U.S. Application Data

(60) Provisional application No. 63/093,941, filed on Oct. 20, 2020.

(51) Int. Cl.
| | | |
|---|---|---|
| *C03C 11/00* | (2006.01) | |
| *C03C 3/093* | (2006.01) | |
| *C03C 15/00* | (2006.01) | |
| *F25D 23/06* | (2006.01) | |

(52) U.S. Cl.
CPC .............. *C03C 11/00* (2013.01); *C03C 3/093* (2013.01); *C03C 15/00* (2013.01); *F25D 23/062* (2013.01); *C03C 2203/30* (2013.01); *C03C 2203/34* (2013.01); *C03C 2203/52* (2013.01); *C03C 2204/06* (2013.01); *F25D 2201/126* (2013.01); *F25D 2201/14* (2013.01)

(58) Field of Classification Search
CPC .. F25D 26/062; F25D 26/065; F25D 2201/12; F25D 2201/14; F25D 2201/126; C03C 11/00; C03C 30/093; C03C 2203/30; C03C 2203/32
See application file for complete search history.

(56) References Cited

U.S. PATENT DOCUMENTS

| | | | |
|---|---|---|---|
| 2,106,744 A | 2/1938 | Hood et al. | |
| 2,221,709 A | 11/1940 | Hood et al. | |
| 2,286,275 A | 6/1942 | Hood et al. | |
| 3,843,341 A * | 10/1974 | Hammel et al. ........ | C03C 3/06 501/39 |
| 3,923,688 A | 12/1975 | Hammel et al. | |
| 3,972,720 A | 8/1976 | Hammel et al. | |
| 4,778,499 A | 10/1988 | Beaver | |
| 4,966,613 A | 10/1990 | Beaver | |
| 5,071,794 A * | 12/1991 | Shaikh .................... | C03C 8/02 501/16 |
| 6,773,793 B2 | 8/2004 | Flynn et al. | |

(Continued)

FOREIGN PATENT DOCUMENTS

| | | |
|---|---|---|
| EP | 0708061 A1 | 4/1996 |
| JP | H10238691 A | 9/1998 |
| JP | H10238938 A | 9/1998 |

*Primary Examiner* — Daniel J Rohrhoff
(74) *Attorney, Agent, or Firm* — Price Heneveld LLP

(57) ABSTRACT

A vacuum insulated structure for use in an appliance includes an inner liner and an outer wrapper coupled to the inner liner. A vacuum insulated cavity is defined therebetween. An insulation material is disposed in the vacuum insulated cavity. The insulation material includes porous glass flakes.

14 Claims, 3 Drawing Sheets

(56) References Cited

U.S. PATENT DOCUMENTS

| | | | |
|---|---|---|---|
| 7,285,508 B2* | 10/2007 | Fujiwara | C09C 1/0018 428/404 |
| 8,603,353 B2* | 12/2013 | Menzel | C01B 33/18 252/62 |
| 8,881,398 B2* | 11/2014 | Hanley | F16L 59/065 29/890.035 |
| 9,228,340 B2* | 1/2016 | Min | B32B 5/26 |
| 9,770,848 B2 | 9/2017 | Baek et al. | |
| 9,925,747 B2 | 3/2018 | Lee et al. | |
| 10,006,581 B2 | 6/2018 | Kuhn et al. | |
| 10,173,354 B2 | 1/2019 | Mack et al. | |
| 10,196,296 B2 | 2/2019 | Hojaji et al. | |
| 2008/0014435 A1* | 1/2008 | Smith | F16L 59/065 428/331 |
| 2013/0105496 A1 | 5/2013 | Jung | |
| 2017/0307128 A1* | 10/2017 | Ueda | B32B 27/304 |
| 2018/0238609 A1* | 8/2018 | Uchida | B32B 5/26 |
| 2019/0144343 A1* | 5/2019 | Deka | C04B 14/24 428/76 |
| 2019/0264859 A1* | 8/2019 | Dherde | F25D 23/062 |
| 2019/0331402 A1* | 10/2019 | Dherde | B21D 22/022 |
| 2022/0315480 A1* | 10/2022 | Aitoku | C03C 3/093 |

* cited by examiner

INSULATION MATERIALS FOR A VACUUM INSULATED STRUCTURE AND METHODS OF FORMING

CROSS-REFERENCE TO RELATED APPLICATION

This application claims priority to and the benefit under 35 U.S.C. § 119(e) of U.S. Provisional Application No. 63/093,941, filed on Oct. 20, 2020, entitled "INSULATION MATERIALS FOR A VACUUM INSULATED STRUCTURE AND METHODS OF FORMING," the disclosure of which is hereby incorporated herein by reference in its entirety.

BACKGROUND OF THE DISCLOSURE

The present disclosure generally relates to insulation materials for use in vacuum insulated structures, and more specifically, to insulation materials for use in vacuum insulated structures used in appliances, such as refrigerators and freezers, and methods of forming said insulation materials.

SUMMARY OF THE DISCLOSURE

According to one aspect of the present disclosure, a vacuum insulated structure for use in an appliance includes an inner liner and an outer wrapper coupled to the inner liner. A vacuum insulated cavity is defined therebetween. An insulation material is disposed in the vacuum insulated cavity. The insulation material includes porous glass flakes.

According to another aspect of the present disclosure, a method of forming an insulation material for a vacuum insulated structure includes heating glass flakes to at least a glass transition temperature of the glass flakes to induce a phase separation of the glass into an acid insoluble silica phase and an acid soluble phase. The glass flakes can be derived from a glass composition containing (by weight): $SiO_2$ from about 40% to about 80%, $B_2O_3$ from about 10% to about 40%, $Na_2O$ from about 1% to about 10%, $Li_2O$ from about 0% to about 3%, CaO from about 0% to about 10%, ZnO from about 0% to about 5%, $P_2O_5$ from about 0% to about 10%, and $Al_2O_3$ from about 0% to about 10%. The method also includes a step of etching the glass flakes to dissolve the acid soluble phase to form porous glass flakes.

According to yet another aspect of the present disclosure, an insulation material for a vacuum insulated structure includes porous glass flakes with an acid insoluble silica phase, at least one opacifier, and at least one filler material.

Aspects of the present disclosure relate to an insulation material containing porous glass flakes that can provide several advantages when used in vacuum insulated structures, such as those that are utilized in home appliances. For example, the porous glass flakes can be formed such that a desired additive is incorporated into the glass flakes at the time of forming the glass flakes rather than in a separate processing step at a later stage, which can provide cost and/or time savings. Aspects of the present disclosure also provide methods for forming porous glass flakes that have a deformed physical shape, which may decrease the degree to which the glass flakes align in stacks within the insulated structure, and thus decrease the solid conductivity of the insulation material. In some aspects, the porous glass flakes may exhibit a high strength compared to some conventional insulation materials, which can reduce the likelihood of bowing of the walls of a vacuum insulated structure that can occur during evacuation of the structure. In some aspects, the porous glass flakes may be less hygroscopic than some conventional insulation materials, which can facilitate faster evacuation of the structure in the process of decreasing the pressure within the structure to form a vacuum insulated structure.

Transition metal oxides such as Cobalt oxide, Manganese oxide, and others can also be added from about 0% to about 10% total. The transition metal oxides add color to the glass, and therefore, may reduce radiative thermal conduction. Consequently, the transition metal oxides could act as opacifiers.

These and other features, advantages, and objects of the present disclosure will be further understood and appreciated by those skilled in the art by reference to the following specification, claims, and appended drawings.

Figure 1:
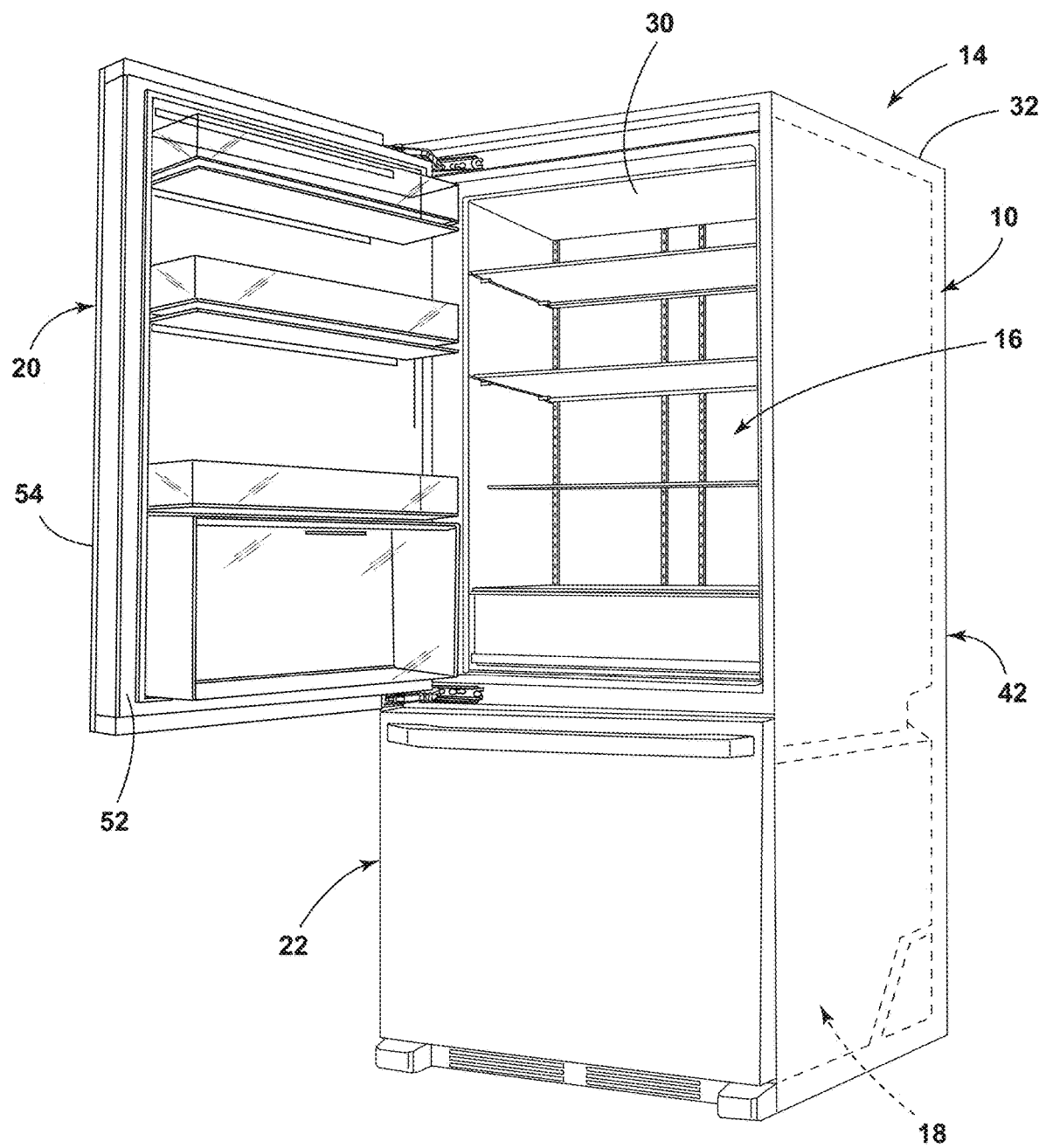
FIG. 1 is a front perspective view of an appliance, according to the present disclosure.

The components in the figures are not necessarily to scale, emphasis instead being placed upon illustrating the principles described herein.

DETAILED DESCRIPTION

The present illustrated embodiments reside primarily in combinations of apparatus components and method steps relating to insulation materials for use in vacuum insulated structures, such as may be used in insulating home appliances. Vacuum insulated structures may be utilized in appliances to limit or control the transfer of heat. It can be challenging to identify materials that provide the desired thermal conductivity and which can be compacted efficiently to achieve the desired final vacuum density in the vacuum insulated structure. In some applications, it can be challenging to achieve a desired final vacuum density while also avoiding damage or deformation to the vacuum insulated structure (e.g., avoiding bowing of the walls of the vacuum insulated structure). Aspects of the present disclosure provide an insulation material that includes porous glass flakes. The porous glass flakes have a thermal conductivity suitable for use in vacuum insulated structures used in appliances and can also have sufficient strength to facilitate forming a desired vacuum in a vacuum insulated structure typically used in an appliance, while decreasing the likelihood of damage/deformation of the vacuum insulated structure during the evacuation process. In addition, the porous glass flakes of the present disclosure may be less hygroscopic than some conventional insulation materials, such as fumed silica, which may increase the rate at which a desired pressure can be reached within the vacuum insulated structure.

Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point. In some aspects, the term "about" may encompass values within ±10%, ±5%, or ±1% of a specified value.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
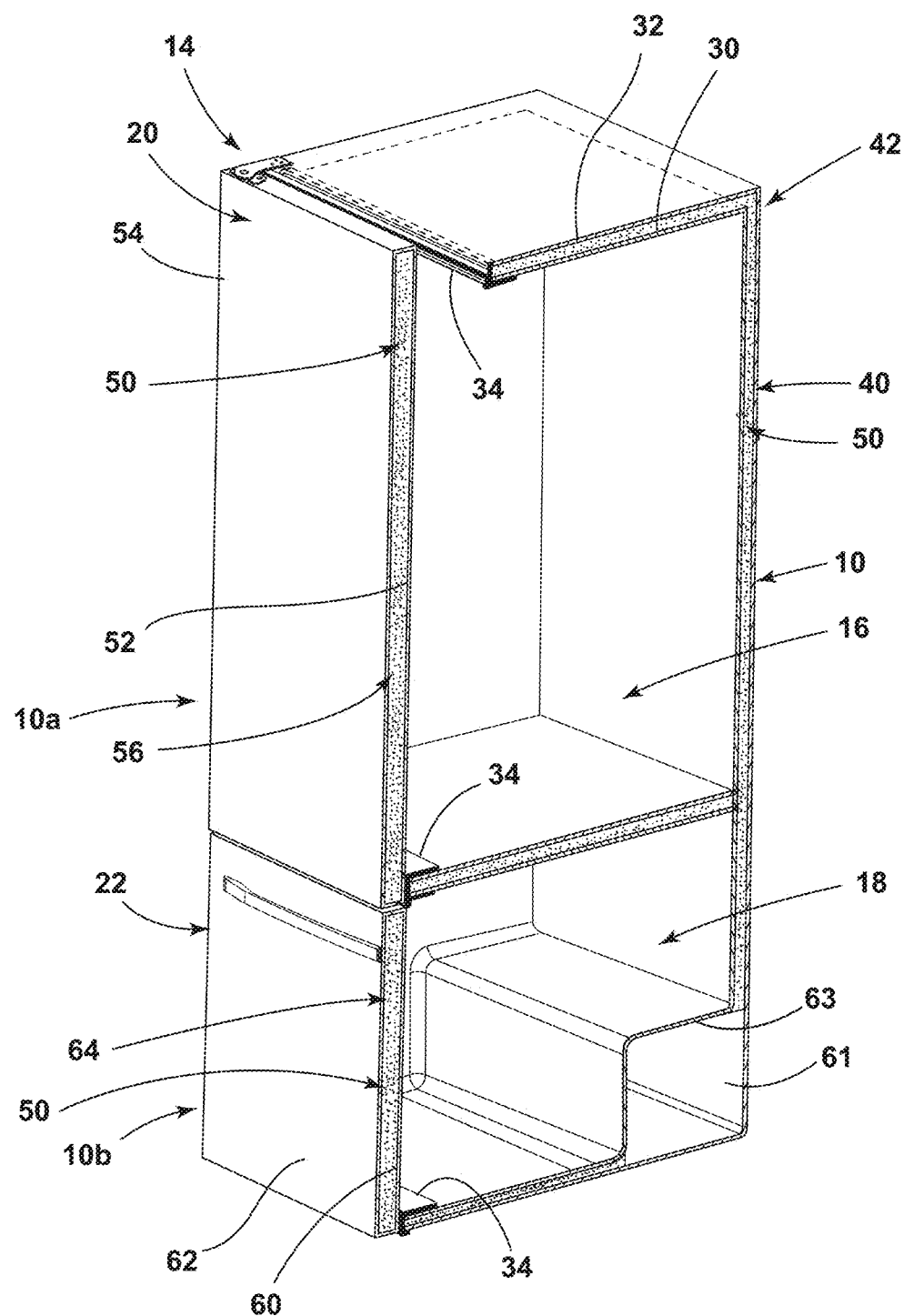
FIG. 2 is a cross-sectional view of the appliance of FIG. 1 including an insulation material, according to the present disclosure.

Referring to FIGS. 1-2, reference numeral 10 generally designates a vacuum insulated structure in the form of a refrigerating appliance 14. The vacuum insulated structure 10 of the present disclosure may be in the form of a vacuum insulated structural cabinet, as illustrated, or a vacuum insulated panel that may be used as an insulation member for the appliance 14. The appliance 14 can be in the form of a refrigerating appliance having a refrigeration compartment 16 and a freezer compartment 18, as illustrated. It is generally contemplated that the appliance 14 can include first and second insulated door assemblies 20, 22 for selectively providing access to the refrigeration compartment 16 and the freezer compartment 18, respectively. The first and second insulated door assemblies 20, 22 may be configured to rotate and/or slide between open and closed position with respect to the appliance 14 to allow for selective access to the refrigeration compartment 16 and the freezer compartment 18, respectively. The appliance 14 can have additional components based on the type of appliance, the details of which are not germane to the aspects of the disclosure, examples of which include a controller, user interface, lights, a compressor, a condenser, an evaporator, an ice maker, a water dispenser, etc. The appliance 14 can also be in the form of a refrigerating appliance including only a refrigeration compartment, only a freezer compartment, or any various combinations and configurations thereof. For example, in non-limiting examples, the refrigerating appliance can be a bottom mount refrigerator, a bottom mount French door refrigerator, a top mount refrigerator, a side-by-side refrigerator, a four-door French door refrigerator, and/or a five door French door refrigerator. While the vacuum insulated structure 10 is described in the context of a refrigerating appliance, it is understood that the vacuum insulated structure 10 can be used in a variety of appliances, examples of which include ovens, dishwashers, water heaters, laundry appliances, and any other appliances that may benefit from insulation.

The vacuum insulated structure 10 can include an inner liner 30 coupled with an outer wrapper 32 to define a vacuum insulated cavity 40 of a cabinet body 42 of the appliance 14. In some embodiments, a trim breaker 34 can be provided for coupling the inner liner 30 with the outer wrapper 32, as illustrated. The trim breaker 34 serves as the connection interface between the inner liner 30 and the outer wrapper 32. The inner liner 30, outer wrapper 32, and optional trim breaker 34, can be considered a structural wrapper that defines the vacuum insulated cavity 40. An insulation material 50 is disposed in the vacuum insulated cavity 40. The vacuum insulated cavity 40 may have a wide range of thicknesses configured to accommodate different insulation materials 50. The insulation material 50 includes porous glass flakes, and optionally one or more additional materials, examples of which include opacifiers, fumed silica, perlite, precipitated silica, aerogel powder, silicon carbide, carbon black powder, graphite, rice husk, ash powder, diatomaceous earth, and cenospheres.

In some aspects, the first and/or second insulated door assemblies 20, 22 can include a vacuum insulated structure 10a and 10b, respectively, that includes the insulation material 50 as described with respect to the vacuum insulated structure 10. The structure and/or materials of the inner liner and outer wrapper components of the first and second insulated door assemblies 20, 22 defining the vacuum insulated cavity 40 within which the insulation material 50 is housed may be different than those of the body of the appliance 14, and thus are labeled with the suffix "a" and "b." However, the body of the appliance 14 may also have the same or similar vacuum insulated cavities 40 to that of the first and second insulated door assemblies 20, 22. The first insulated door assembly 20 can include a first door inner liner 52 and a first door outer wrapper 54, which together define a first door insulating cavity 56. The second insulated door assembly 22 can include a second door inner liner 60 and a second door outer wrapper 62, which together define a second door insulating cavity 64. The insulation material 50 may be present in one or both of the first and second door insulating cavities 56, 64. In some aspects, the insulation material 50 may be the same in the vacuum insulated cavity 40 and the first and second door insulating cavities 56, 64. In other aspects, at least one of the vacuum insulated cavity 40, the first door insulating cavity 56, and the second door insulating cavity 64 may have a different insulation material than the other of the vacuum insulated cavity 40, the first door insulating cavity 56, and the second door insulating cavity 64. In some aspects, one or both of the first and second insulated door assemblies 20, 22 does not include the vacuum insulated structure 10a, 10b. Optionally, the first and second insulated door assemblies 20, 22 may include an aesthetic exterior skin (not shown).

The inner liner 30, outer wrapper 32, optional trim breaker 34, first and second door inner liners 52, 60, and first and second door outer wrappers 54, 62, can be made from any suitable metal, metal-alloy, and/or polymeric material, and may be the same or different. The materials chosen will likely be the same or complementary and can be configured to be fastened, welded, adhered, etc. together. The inner liner 30, outer wrapper 32, and optional trim breaker 34 can be made from materials suitable for maintaining a vacuum within the vacuum insulated cavity 40 (i.e., maintain a predetermined lower pressure within the vacuum insulated cavity 40, relative to ambient pressure). When the first and second insulated door assemblies 20, 22 include the vacuum insulated structure 10a, 10b, the first and second door inner liners 52, 60, and first and second door outer wrappers 54, 62 can be made from materials suitable for maintaining a vacuum within the respective first and second door insulating cavities 56, 64.

While aspects of the insulation material 50 are described with respect to the vacuum insulated structure 10 used to form the cabinet body 42 of the appliance 14, it will be understood that aspects of the insulation material 50 can be used with one or both of the vacuum insulated structures 10a, 10b of the first and second insulated door assemblies 20, 22, respectively. Also, it will be noted that the vacuum insulated cavity 40 may extend along the inner liner 30 at a machine compartment 61. A stepped portion 63 defined by the inner liner 30 may include a vacuum insulated area that insulates the interior of the appliance from heat generated within the machine compartment 61.

The insulation material 50 includes porous glass flakes and may optionally include one or more additional filler materials. The porous glass flakes can be used alone or in combination with the one or more additional filler materials to provide the insulation material 50 with the desired characteristics, such as thermal conductivity and vacuum density, based on the intended application of the vacuum insulated structure 10. The glass flakes are inert, and, therefore, are generally or completely resistant to corrosion. The glass flakes can be formed from a glass composition that is phase separable upon heating to temperatures at or above the glass transition temperature ($T_g$) of the glass flakes into an acid insoluble silica phase and an acid soluble phase. The phase-separated glass flakes can then be etched to dissolve the acid soluble phase and form porous glass flakes. In some aspects, the acid soluble phase is an acid soluble alkali phase.

The glass composition for forming the glass flakes can include, in percent by weight (wt %): about 40 wt % to about 80 wt % $SiO_2$, about 10 wt % to about 40 wt % $B_2O_3$, about 1 wt % to about 10 wt % $Na_2O$, about 0 wt % to about 3 wt % $Li_2O$, about 0 wt % to about 10 wt % CaO, about 0 wt % to about 5 wt % ZnO, about 0 wt % to about 10 wt % $P_2O_5$, and about 0 wt % to about 10 wt % $Al_2O_3$. In some aspects, the glass composition for forming the glass flakes can also include one or more opacifiers. Non-limiting examples of suitable opacifiers include magnesium oxide, cobalt oxide, and carbon black powder. In some aspects, the opacifier is an additive adapted to absorb infrared radiation.

In some aspects, the glass flakes can have an average thickness of from about 10 nm to about 10 μm. In some examples, the glass flake can have an average thickness of from about 10 nm to about 10 μm, about 50 nm to about 10 μm, about 100 nm to about 10 μm, about 250 nm to about 10 μm, about 500 nm to about 10 μm, about 750 nm to about 10 μm, about 1 μm to about 10 μm, about 2 μm to about 10 μm, about 5 μm to about 10 μm, about 8 μm to about 10 μm, about 10 nm to about 8 μm, about 50 nm to about 8 μm, about 100 nm to about 8 μm, about 250 nm to about 8 μm, about 500 nm to about 8 μm, about 750 nm to about 8 μm, about 1 μm to about 8 μm, about 2 μm to about 8 μm, about 5 μm to about 8 μm, about 10 nm to about 5 μm, about 50 nm to about 5 μm, about 100 nm to about 5 μm, about 250 nm to about 5 μm, about 500 nm to about 5 μm, about 750 nm to about 5 μm, about 1 μm to about 5 μm, about 2 μm to about 5 μm, about 10 nm to about 2 μm, about 50 nm to about 2 μm, about 100 nm to about 2 μm, about 250 nm to about 2 μm, about 500 nm to about 2 μm, about 750 nm to about 2 μm, about 1 μm to about 2 μm, about 10 nm to about 1 μm, about 50 nm to about 1 μm, about 100 nm to about 1 μm, about 250 nm to about 1 μm, about 500 nm to about 1 μm, about 750 nm to about 1 μm, about 10 nm to about 750 nm, about 50 nm to about 750 nm, about 100 nm to about 750 nm, about 250 nm to about 750 nm, about 500 nm to about 750 nm, about 100 nm to about 1000 nm, about 100 nm to about 900 nm, about 100 nm to about 800 nm, about 100 nm to about 700 nm, about 100 nm to about 600 nm, about 100 nm to about 500 nm, about 100 nm to about 400 nm, about 100 nm to about 300 nm, about 100 nm to about 200 nm, about 200 nm to about 1000 nm, about 200 nm to about 900 nm, about 200 nm to about 800 nm, about 200 nm to about 700 nm, about 200 nm to about 600 nm, about 200 nm to about 500 nm, about 200 nm to about 400 nm, about 200 nm to about 300 nm, about 300 nm to about 1000 nm, about 300 nm to about 900 nm, about 300 nm to about 800 nm, about 300 nm to about 700 nm, about 300 nm to about 600 nm, about 300 nm to about 500 nm, about 300 nm to about 400 nm, about 400 nm to about 1000 nm, about 400 nm to about 900 nm, about 400 nm to about 800 nm, about 400 nm to about 700 nm, about 400 nm to about 600 nm, about 400 nm to about 500 nm, about 500 nm to about 1000 nm, about 500 nm to about 900 nm, about 500 nm to about 800 nm, about 500 nm to about 700 nm, about 500 nm to about 600 nm, about 700 nm to about 1000 nm, about 800 nm to about 1000 nm, or about 900 nm to about 1000. To obtain the proper size glass flakes, the glass flakes may be separated by particle size distribution through a sieve.

In some aspects, the glass flakes can have an aspect ratio of from about 100 to about 2,000. As used herein, the aspect ratio refers to the ratio of a length of the flake to an average thickness of the flake (length/thickness). The length of the flake is measured as the longest axis of the flake and the thickness is measured as the dimension perpendicular to the longest axis (the length). For example, the glass flakes can have an aspect ratio of from about 100 to about 2,000, about 250 to about 2,000, about 500 to about 2,000, about 750 to about 2,000, about 1,000 to about 2,000, about 1,500 to about 2,000, about 1,750 to about 2,000, about 100 to about 1,750, about 250 to about 1,750, about 500 to about 1,750, about 750 to about 1,750, about 1,000 to about 1,750, about 1,500 to about 1,750, about 100 to about 1,500, about 250 to about 1,500, about 500 to about 1,500, about 750 to about 1,500, about 1,000 to about 1,500, about 100 to about 1,000, about 250 to about 1,000, about 500 to about 1,000, about 750 to about 1,000, about 100 to about 750, about 250 to about 750, about 500 to about 750, about 100 to about 500, or about 250 to about 500.

Figure 3:
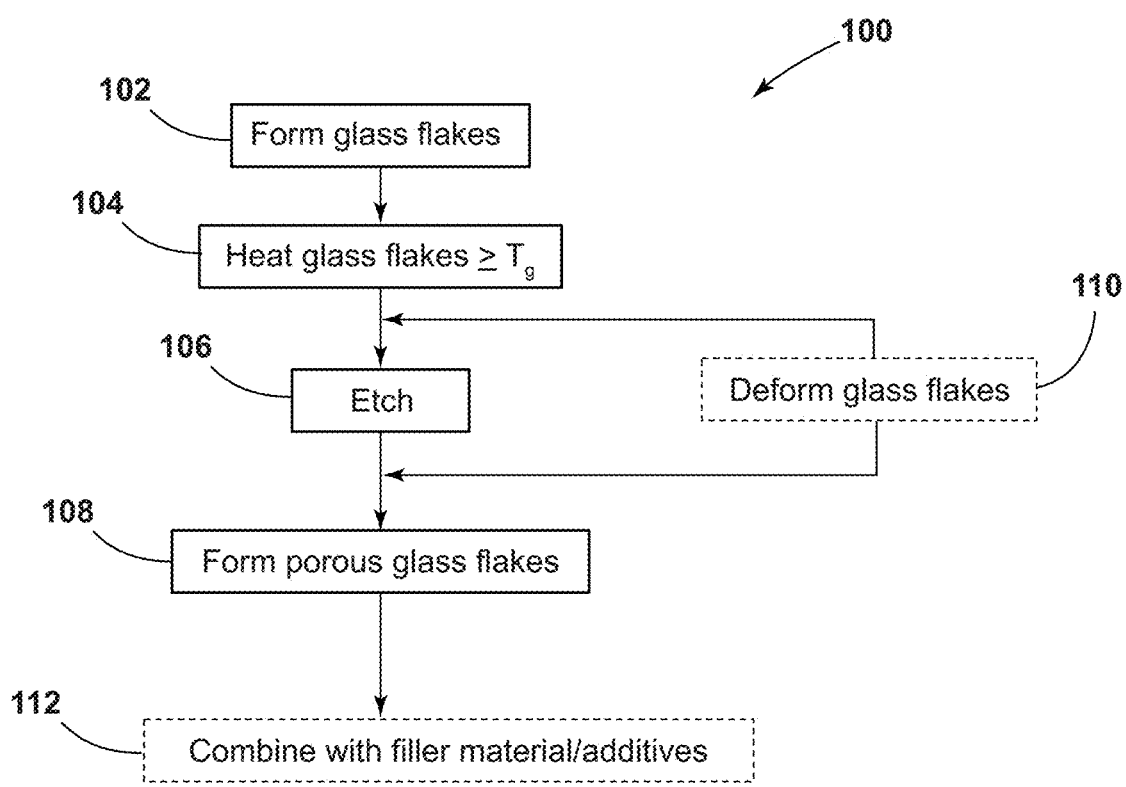
FIG. 3 is flow chart illustrating a method of forming an insulation material, according to the present disclosure.

FIG. 3 illustrates a method 100 for forming an insulation material 50 containing the porous glass particles according to aspects of the present disclosure. The method 100 can be used to form an insulation material 50 for use in the vacuum insulated structures 10, 10a, and/or 10b, and any other vacuum insulated structure suitable for use in insulating an appliance.

The method 100 of FIG. 3 includes forming glass flakes at step 102. The glass flakes at step 102 can be formed using the glass composition described above according to any suitable method for forming glass flakes. In one example, the glass composition can be used to form a glass melt that is then poured onto a rotating disk. The rotating disk can be mounted within an enclosed box to which a vacuum is applied. Parameters such as the rate the glass melt is poured and the speed of the rotating disk can be selected to provide a glass sheet having the desired thickness. The glass sheet can then be broken into smaller fragments to form glass flakes. In another example, a glass melt can be formed from the glass composition and the glass melt can be inflated into a hollow glass film having a balloon-like shape by a blowing gas supplied through a nozzle. The hollow glass film can then be crushed (e.g., using pressure rolls) to form the glass flakes. In yet another example, glass flakes can be formed by drawing a thin sheet of glass from a glass melt and then breaking the sheet of glass to form glass flakes.

In some embodiments, the glass composition used to form the glass flakes at step 102 can include one or more opacifiers, and optionally one or more additional additives. Non-limiting examples of suitable opacifiers include magnesium oxide, cobalt oxide, and carbon black powder. In this manner, the opacifiers and optional additives can be incorporated into the glass flakes, which may provide time and/or cost savings compared to adding the opacifiers and optional additives in a separate processing step at a later stage.

The glass flakes formed at step 102 can be heat treated at step 104 at a temperature at or above the glass transition temperature $T_g$ of the glass flakes. The temperature and the heating time period of the step 104 can be selected such that the glass phase-separates into an acid insoluble silica phase and an acid soluble phase. The phase-separated glass flakes can then be treated with an etchant in an etching step 106 to dissolve the acid soluble phase. Removal of the acid soluble phase creates pores in the acid insoluble phases of the glass, thus forming porous glass flakes at step 108. The etchant can be any suitable material capable of dissolving the acid soluble phase, examples of which include hydrochloric acid, hydrofluoric acid, and nitric acid.

Without wishing to be limited by any theory, it is believed that the porosity of the glass flakes affects the thermal conductivity of the glass flakes. The components of the glass composition, parameters of the heat treatment at step 104, and/or parameters of the etching at step 106 can be selected to provide the glass flakes with the desired porosity. For example, the degree of phase separation induced during the heat treatment at step 104 can be affected by parameters such as the temperature and heating time period. In another example, the degree to which the acid soluble phase is dissolved in the etching step 106 can be affected by parameters such as the type of etchant, etchant concentration, temperature, and etching time.

The method 100 can optionally include an additional heating step 110 before and/or after the etching step 106. The additional heating step 110 can include heating the glass flakes to a temperature at or below the glass transition temperature $T_g$ of the glass flakes to deform the physical shape of the glass flakes. Deforming the shape glass flakes can provide the glass flakes with rounded edges and/or deviations in the cross-sectional shape of the flake (i.e., compared to the initial cross-sectional shape of the as-formed flake). Without wishing to be bound by any theory, it is believed that deforming the glass flakes decreases the degree to which the glass flakes align in stacks within the vacuum insulated cavity 40. Alignment and stacking of the glass flakes can increase the solid conductivity of the insulation material 50, which may be undesirable in some applications.

The method 100 of forming the insulation material 50 can also include an optional step 112 of combining the porous glass flakes formed at step 108 with additional filler materials and/or additives. For example, the porous glass flakes formed at step 108 can be combined with other filler materials, examples of which include fumed silica, perlite, precipitated silica, aerogel powder, silicon carbide, carbon black powder, graphite, rice husk, ash powder, diatomaceous earth, and cenospheres, to form an insulation material 50 having the desired characteristics, such as thermal conductivity, bulk density, and achievable final vacuum density. Additionally, or alternatively, the porous glass flakes formed at step 108 can be combined with one or more additives, such as opacifiers, colorants, electrical conductivity additives, radiant energy reflectivity additives, infrared absorbing additives, etc.

In some embodiments, all of the steps 102 through 108, and optional steps 110 and/or 112, of method 100 can be performed at a single processing location. In other embodiments, one or more of the steps 102 through 108, and optional steps 110 and/or 112, can be performed at an off-site location(s) with respect to the other steps. For example, the process of the forming the glass flakes at step 102 may be performed off-site or purchased from a supplier and treated according to the steps 104 through 108, and optional steps 110 and/or 112, to form the insulation material 50. In another example, the porous glass flakes can be formed according to steps 102 through 108, and optional step 110, off-site or purchased from a supplier, and then combined with additional filler materials and/or additives at step 112 to form the insulation material 50.

The insulation material 50 according to the present disclosure can be used with any suitable vacuum insulated structure, such as the vacuum insulated structures 10, 10a, and/or 10b of FIGS. 1-2. For example, with respect to the vacuum insulated structure 10, the inner liner 30 can be assembled with the outer wrapper 32 such that the walls of the inner liner 30 are spaced from the adjacent walls of the outer wrapper 32 to define the vacuum insulated cavity 40. The trim breaker 34 can be coupled with the open ends of the inner liner 30 and the outer wrapper 32 to seal the vacuum insulated cavity 40. In some embodiments, the open ends of the inner liner 30 and outer wrapper 32 include flanges that can be coupled to seal the vacuum insulated cavity 40 in addition to or as an alternative to the trim breaker 34. Sealing the inner liner 30, outer wrapper 32, and optional trim breaker 34 can include any suitable combination of welds, adhesives, gaskets, seals, and/or connecting structures. The insulation material 50 can be filled into the sealed vacuum insulated cavity 40 through one or more filling ports. The filled vacuum insulated cavity 40 can then be evacuated through one or more evacuation ports to create a vacuum chamber within the vacuum insulated cavity 40. For example, the vacuum insulated cavity 40 can be fluidly coupled with an external vacuum system to draw air from the vacuum insulated cavity 40 to obtain a lower pressure within the vacuum insulated cavity 40 relative to ambient pressure (i.e., form a vacuum insulated structure). The vacuum insulated structures 10a and 10b used with the first and second insulated door assemblies 20, 22 can be formed in a similar manner.

In other embodiments, the vacuum insulated structures 10, 10a, and/or 10b can be in the form of individual panels having an inner liner and an outer wrapper defining an insulating cavity into which the insulation material 50 is filled. These vacuum insulated panels can then be used within the vacuum insulated cavity 40, the first door insulating cavity 56, and/or the second door insulating cavity 64 of the cabinet body 42, the first insulated door assembly 20, and/or the second insulated door assembly 22, respectively. While the insulation material and vacuum insulated structures of the present disclosure are described in the context of home appliances, it is understood that the insulation material and vacuum insulated structures can be utilized in any other applications where sound and/or thermal insulation may be desired.

The following non-limiting aspects are encompassed by the present disclosure. To the extent not already described, any one of the features of the first through the twentieth aspects may be combined in part or in whole with features of any one or more of the other aspects of the present disclosure to form additional aspects, even if such a combination is not explicitly described.

According to one aspect of the present disclosure, a vacuum insulated structure for use in an appliance includes an inner liner and an outer wrapper coupled to the inner liner. A vacuum insulated cavity is defined therebetween. An insulation material is disposed in the vacuum insulated cavity. The insulation material includes porous glass flakes.

According to another aspect, an insulation material includes fumed silica, perlite, precipitated silica, aerogel powder, silicon carbide, carbon black powder, graphite, rice husk, ash powder, diatomaceous earth, and cenospheres.

According to still another aspect of the present disclosure, the porous glass flakes have an aspect ratio of from about 100 to about 2,000.

According to another aspect of the present disclosure, the porous glass flakes comprise an acid insoluble silica phase.

According to another aspect, an insulation material includes at least one opacifier.

According to yet another aspect, the porous glass flakes include at least one opacifier.

According to still another aspect of the present disclosure, at least one opacifier of the porous glass flakes is selected from magnesium oxide, cobalt oxide, and carbon black powder.

According to another aspect, the porous glass flakes have an average thickness of from about 10 nm to about 10 μm.

According to still another aspect of the present disclosure, a vacuum insulated structure includes fumed silica and at least one opacifier.

According to another aspect of the present disclosure, a method of forming an insulation material for a vacuum insulated structure includes heating glass flakes to at least a glass transition temperature of the glass flakes to induce a phase separation of the glass flakes into an acid insoluble silica phase and an acid soluble phase. The glass flakes are derived from a glass composition that includes (by weight): $SiO_2$ from about 40% to about 80%, $B_2O_3$ from about 10% to about 40%, $Na_2O$ from about 1% to about 10%, $Li_2O$ from about 0% to about 3%, CaO from about 0% to about 10%, ZnO from about 0% to about 5%, $P_2O_5$ from about 0% to about 10%, and $Al_2O_3$ from about 0% to about 10%. Then, the glass flakes are etched to dissolve the acid soluble phase to form porous glass flakes.

According to another aspect of the present disclosure, a method of forming an insulation material for a vacuum insulated structure includes combining the porous glass flakes with at least one of fumed silica, perlite, precipitated silica, aerogel powder, silicon carbide, carbon black powder, graphite, rice husk, ash powder, diatomaceous earth, and cenospheres.

According to still another aspect, a method of forming an insulation material for a vacuum insulated structure includes a step of combining the porous glass flakes with at least one of fumed silica, perlite, precipitated silica, aerogel powder, silicon carbide, carbon black powder, graphite, rice husk, ash powder, diatomaceous earth, and cenospheres that further includes the porous glass flakes having an aspect ratio of from about 100 to about 2,000.

According to yet another aspect of the present disclosure, a method of forming an insulation material for a vacuum insulated structure includes a step of step of combining the porous glass flakes with at least one of fumed silica, perlite, precipitated silica, aerogel powder, silicon carbide, carbon black powder, graphite, rice husk, ash powder, diatomaceous earth, and cenospheres that further includes the porous glass flakes having an average thickness of from about 10 nm to about 10 μm.

According to another aspect of the present disclosure, a method of forming an insulation material for a vacuum insulated structure includes heating the glass flakes to a temperature less than the glass transition temperature of the glass flakes one of prior to the etching or subsequent to the etching to deform a shape of the porous glass flakes.

According to still another aspect of the present disclosure, a method of forming an insulation material for a vacuum insulated structure includes applying at least one opacifier in the form of transition metal oxides from about 0% to about 10% to the glass composition.

According to still another aspect, a method of forming an insulation material for a vacuum insulated structure includes a step of applying at least one opacifier that further includes selecting the opacifier from magnesium oxide, cobalt oxide, and carbon black powder.

According to another aspect of the present disclosure, an insulation material for a vacuum insulated structure includes porous glass flakes that have an acid insoluble silica phase, at least one opacifier, and at least one filler material.

According to still another aspect of the present disclosure, at least one filler material is selected from fumed silica, perlite, precipitated silica, aerogel powder, silicon carbide, carbon black powder, graphite, rice husk, ash powder, diatomaceous earth, cenospheres, and combinations thereof.

According to another aspect of the present disclosure at least one opacifier is incorporated into the porous glass flakes.

According to yet another aspect of the present disclosure, at least one opacifier is selected from magnesium oxide, cobalt oxide, and carbon black powder.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated structure for use in an appliance, comprising:
    an inner liner;
    an outer wrapper coupled to the inner liner and defining a vacuum insulated cavity therebetween; and
    an insulation material disposed in the vacuum insulated cavity, wherein the insulation material comprises porous glass flakes.

2. The vacuum insulated structure of claim 1, wherein the insulation material further comprises fumed silica, perlite, precipitated silica, aerogel powder, silicon carbide, carbon black powder, graphite, rice husk, ash powder, diatomaceous earth, and cenospheres.

3. The vacuum insulated structure of claim 1, wherein the porous glass flakes have an aspect ratio of from about 100 to about 2,000.

4. The vacuum insulated structure of claim 1, wherein the porous glass flakes comprise an acid insoluble silica phase.

5. The vacuum insulated structure of claim 1, wherein the insulation material further comprises at least one opacifier.

6. The vacuum insulated structure of claim 1, wherein the porous glass flakes comprise at least one opacifier.

7. The vacuum insulated structure of claim 6, wherein the at least one opacifier of the porous glass flakes is selected from magnesium oxide, cobalt oxide, and carbon black powder.

8. The vacuum insulated structure of claim 6, wherein the porous glass flakes are derived from a glass composition comprising (by weight):
    $SiO_2$ from about 40% to about 80%,
    $B_2O_3$ from about 10% to about 40%,
    $Na_2O$ from about 1% to about 10%,
    $Li_2O$ from about 0% to about 3%,
    CaO from about 0% to about 10%,
    ZnO from about 0% to about 5%,
    $P_2O_5$ from about 0% to about 10%, and
    $Al_2O_3$ from about 0% to about 10%.

9. The vacuum insulated structure of claim 8, wherein the at least one opacifier is in the form of a transition metal oxide from about 0% to about 10% to the glass composition.

10. The vacuum insulated structure of claim 6, wherein the at least one opacifier is incorporated into the porous glass flakes.

11. The vacuum insulated structure of claim 1, wherein the porous glass flakes have an average thickness of from about 10 nm to about 10 μm.

12. The vacuum insulated structure of claim 1, further comprises:
    fumed silica and at least one opacifier.

13. The vacuum insulated structure of claim 1, wherein glass flakes are heated to at least a glass transition temperature of the glass flakes to induce a phase separation of the glass flakes into an acid insoluble silica phase and an acid soluble phase.

14. The vacuum insulated structure of claim 13, wherein the glass flakes are etched to dissolve the acid soluble phase to form the porous glass flakes.

* * * * *